UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF FRUIT BEVERAGE EXTRACTS.

1,189,127.     Specification of Letters Patent.     Patented June 27, 1916.

No Drawing.     Application filed November 19, 1915. Serial No. 62,333.

*To all whom it may concern:*

Be it known that I, JOHN LEONARD KELLOGG, a citizen of the United States, residing in Battle Creek, county of Calhoun, and State of Michigan, have invented a new and useful Improvement in the Manufacture of Fruit Beverage Extracts, of which the following is a specification.

My invention relates to the manufacture of concentrated extracts from fruits, said extracts being used primarily, by dissolving in water, to make a beverage having the flavor of the fruit.

Heretofore, grape juice, orange juice, pine apple juice, lime and other fruit syrups have been made by first cooking the fruit and then extracting the juice from the cooked fruit. But in this process of cooking, most of the fragrant odor and flavoring is lost by being carried away with the steam which arises from the fruit. It has also been proposed to dissolve the aromatic substances out of the natural fruit juice with chloroform or other suitable solvent, which is non-miscible with the juice, then separate the juice from the solvent containing the aromatic substances, then free both the juice and the aromatic substances from the solvent, then concentrate the juice and mix therewith the aromatic substances.

In my invention, I prefer first lightly to cook and distil from the fruit some of the moisture together with the substances which make or constitute the flavors and odors of the fruit. This moisture and aromatic substances are collected and condensed into an aromatic flavoring liquid. From the lightly cooked fruit, the remaining liquors are then pressed, and, by preference, distilled at a low temperature so as to obtain as much flavoring with as little moisture as possible. This additional flavoring is, by preference, collected, condensed and added to that obtained by the first light distillation of the fruit. The juice from which this additional flavoring has been distilled, is then concentrated to a syrup, with which the condensed flavoring liquid is added in sufficient quantity to restore the original flavoring of the fruit, and this product, also my invention, is used when desired by dissolving in water to make a beverage having all the flavoring and aromatic qualities of the natural fruit.

In the performance of my invention in detail, I prefer first thoroughly to wash and clean the fruit, which may be grapes, oranges, pineapples, limes or any other kind of fruit. I then prefer slightly to cook the fruit so as to bring out the flavoring, which is generally inclosed in the fibrous materials which make up the structural or meaty part of the fruit. For instance, in grapes the strongest flavoring lies directly beneath the skin, and this cannot be taken out unless the fruit is first slightly cooked.

To cook the fruit thus lightly, I prefer to use a specially designed cooking vacuum with mixer and condenser coils for condensing the vapor which arises off the cooking material. This specially designed apparatus will be described in a separate application for patent to be filed by me; but any ordinary and appropriate form of vacuum still and condenser may be used in place thereof. This light cooking process is, by preference, done very quickly so that as little moisture as possible is driven off with the flavor and odors. This moisture, with the flavor and odors, is caught in condensing coils, condensed into a liquid and collected in a suitable reservoir, one special form of which will be described in my other application for a special apparatus above referred to. The fruit which has thus been treated is then put through the press and the remaining liquors pressed therefrom. These remaining liquors are then placed, preferably, in a vacuum pan and maintained at a low temperature, about 110° F., until the remaining flavoring has been distilled from the liquor. This low temperature is maintained so as to obtain as much flavoring with as little moisture as possible. This distilled moisture and flavoring is preferably condensed and collected as in the case of the initial distillation, and added to the flavoring liquid obtained from such first distillation. The liquor from which the flavoring has thus been last distilled, is then by preference boiled down in a vacuum to a syrup. I now prefer to concentrate the syrup to a density of about 40° B., but such density may be varied as desired according to circumstances. The condensed flavoring material is then mixed with this concentrated syrup in sufficient proportions to restore to the product the flavoring and aromatic qualities of the natural fruit, and the product is then, preferably, sterilized and packed for the market.

My new product will be found to have all the flavor, odor, aromatic and other palatable qualities of the original fruit, these having been, by my process, retained and restored to the concentrated fruit juice.

One or two teaspoonfuls of this concentrated product in a glass of water will make a delicious beverage having all the aroma and fragrancy of the fresh fruit.

It is evident that the cost of packing and shipping this concentrated product is considerably less than the ordinary unconcentrated fruit juices, such as grape juice.

I claim as my invention:

1. The process of making a fruit beverage extract during the performance of which the fruit is lightly cooked and part of the flavoring distilled therefrom and condensed, the juice then pressed from the fruit and concentrated, and the condensed flavoring material added thereto.

2. The process of making a fruit beverage extract during the performance of which the fruit is lightly cooked, and part of the flavoring distilled therefrom and condensed, the juice then pressed from the fruit, additional flavoring distilled from the juice and condensed and added to the condensed flavoring initially obtained from the fruit, the juice then concentrated and the condensed flavoring material added thereto.

3. A fruit beverage extract into the composition of which enters a concentrated juice pressed from the lightly cooked fruit and flavoring material initially distilled from the lightly cooked fruit.

4. A fruit beverage extract, into the composition of which enters a concentrated juice pressed from the lightly cooked fruit, flavoring material initially distilled from the lightly cooked fruit, and additional flavoring material distilled from the juice before concentration of the juice.

JOHN LEONARD KELLOGG.